United States Patent [19]

Gernez

[11] 4,381,018

[45] Apr. 26, 1983

[54] FLUIDIZATION UNIT

[75] Inventor: Alain Gernez, St. Jean de la Ruelle, France

[73] Assignee: Compagnie Europeenne pour l'Equipement Menager "CEPEM", Paris, France

[21] Appl. No.: 115,176

[22] Filed: Jan. 25, 1980

[30] Foreign Application Priority Data

Jan. 25, 1979 [FR] France ............................... 79 01969

[51] Int. Cl.$^3$ ............................................. B05C 19/02

[52] U.S. Cl. ............................. 137/592; 118/DIG. 5; 427/185; 427/27

[58] Field of Search ................. 137/592; 118/DIG. 5, 118/DIG. 6, 429; 427/182, 185, 27; 220/324, 326

[56] References Cited

U.S. PATENT DOCUMENTS

| | | | |
|---|---|---|---|
| 2,220,193 | 11/1940 | Ahlmann | 117/DIG. 6 |
| 3,126,444 | 3/1964 | Taylor | 220/306 X |
| 3,250,643 | 5/1966 | Sergent | 118/DIG. 5 X |
| 3,360,644 | 12/1967 | Lillebostad | 220/324 X |
| 3,672,927 | 6/1972 | Spiller et al. | 117/DIG. 6 X |
| 3,951,099 | 4/1976 | Minckler | 118/DIG. 5 X |
| 4,063,532 | 12/1977 | Kipple et al. | 118/DIG. 5 X |
| 4,072,777 | 2/1978 | Schoenthaler | 427/433 |
| 4,243,699 | 1/1981 | Gibson | 427/183 |

FOREIGN PATENT DOCUMENTS 1265004 1/1972 United Kingdom .

*Primary Examiner*—A. Michael Chambers

*Attorney, Agent, or Firm*—Sughrue, Mion, Zinn, Macpeak & Seas

[57] ABSTRACT

A fluidization unit comprising a fluidizer (2) and a chamber (1) for containing a granular, powdery or like substance (3) to be fluidized. The chamber has at least one air-tight wall and the fluidizer comprises an assembly of an air-tight base sheet member (5), a porous sheet member (4), and a peripheral sealing member (6), holding the sheet members apart in a fixed relationship. In operation, said fluidizer is placed in the chamber with its air-tight base member resting against an air-tight wall of the chamber. A preferred application is in the handling of powders for electrostatic enamelling.

3 Claims, 12 Drawing Figures

FLUIDIZATION UNIT

The present invention concerns a fluidisation unit for fluidising granular, powdery or a like substances.

BACKGROUND

Fluidisation is a known principle. It is used to make the behaviour of a granular, powdery or like substance similar to that of a fluid. Fluidisation consists in injecting a low speed flow of gas into the particles of the substance, the flow of gas entrains the particle in a rising motion which is opposed by gravity, and this can be arranged to give the gas-particle mixture the behaviour of a fluid. The flow of gas is generally obtained by making the fluidising gas pass through a porous plate. Fluidisers are generally rigid and constitute the bottom of a fluidising tank, or if not actually constituting the bottom they are very securely fastened thereto. Further, current design for fluidising tank bottoms results in the members being difficult to disassemble, requiring a large amount of work to change the porous plate for example.

The aim of the present invention is to simplify the design of such fluidising members so that they may be rapidly changed should the need arise. Another aim of the invention is to provide means for mixing the fluidised substance by creating zones of differing degrees of fluidisation.

THE INVENTION

The present invention provides a fluidisation unit comprising a fluidiser and a chamber for containing a granular, powdery or like substance to be fluidised, wherein the chamber has at least one air-tight wall, and the fluidiser comprises an assembly of an air-tight base sheet member, a porous sheet member, and a peripheral sealing member holding the sheet members apart in a fixed relationship, said fluidiser being placed, in operation, in the chamber with its air-tight base member resting against an air-tight wall of the chamber.

BRIEF DESCRIPTION OF THE DRAWINGS

Embodiments of the invention are described by way of example, with reference to the accompanying drawings in which.

DETAILED DESCRIPTION

Figure 1:
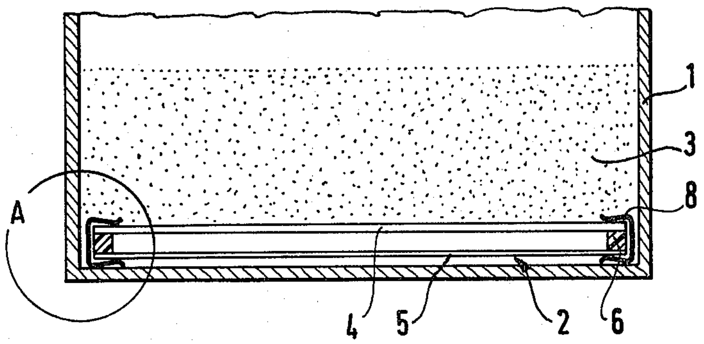
FIG. 1 is a section through a fluidising chamber in accordance with the invention.
Figure 2:
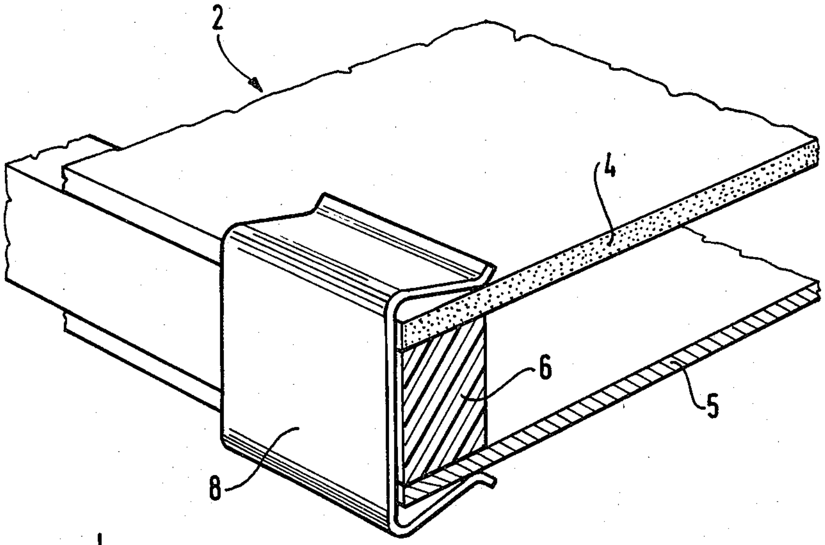
FIG. 2 is a prospective view of the edge of a fluidiser showing a fixing clip.
Figure 3:
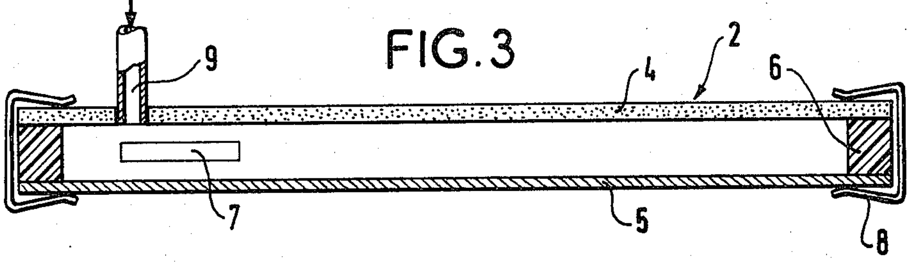
FIG. 3 is a section through a fluidiser.

In the embodiment shown in FIGS. 1,2 and 3, the fluidisation chamber is constituted by a rectangular tank 1 having at least one non-porous wall having a fluidiser 2 resting on the bottom of the tank and a substance to be fluidised 3 on top of the fluidiser. The chamber 1 could alternatively constitute a duct as at 1*a*, FIG. 11, for conveying or transporting the fluidised substance.

The fluidiser comprises an assembly of a porous sheet member in the form of a plate 4 and a non-porous base sheet member in the form of a plate 5 with a peripheral sealing member 6, e.g. of rubber, holding the plates apart. A set of clips 8 holds the assembly together. In the space between the porous plate 4 and the base plate 5, there is an air-conditioning system 7 for ensuring that the fluidisation air is at an appropriate temperature and an appropriate degree of humidity.

Figure 12:
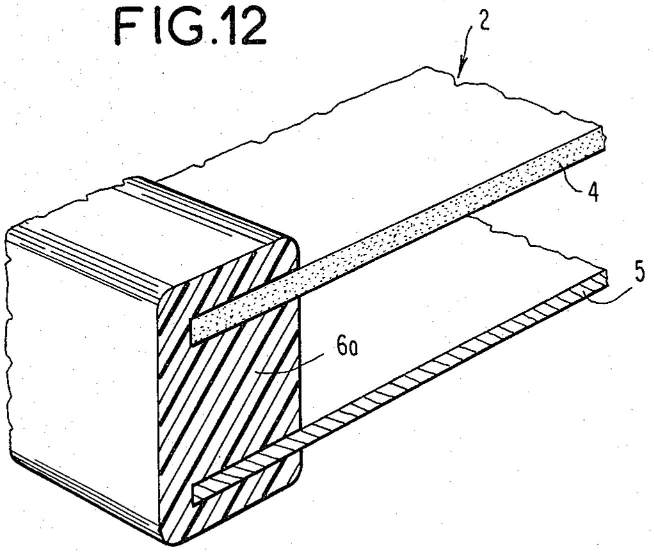
FIG. 12 is a sectional, perspective view of a portion of a fluidiser forming yet another embodiment of the present invention.

It is advantageous to use clips 8 to hold the parts together since they make it possible to change a faulty part rapidly should the need arise. However, other fixing systems could be used such as glue or screws. A preferred alternative is to use elongated section members, as at 6*a*, FIG. 12, e.g. extruded aluminium or rubber, serving both as a seal and as a clip.

The fluidiser may be supplied with gas from below, through the side, or from above through the porous member. It is advantageous for the supply to be through the porous plate, either via a pipe 9 which passes through the plate, or by blowing air from a pipe pressed against the porous plate or simply coming close thereto. The supply of air through the porous plate facilitates simply placing the fluidiser against a wall of the fluidising chamber.

Figure 4:
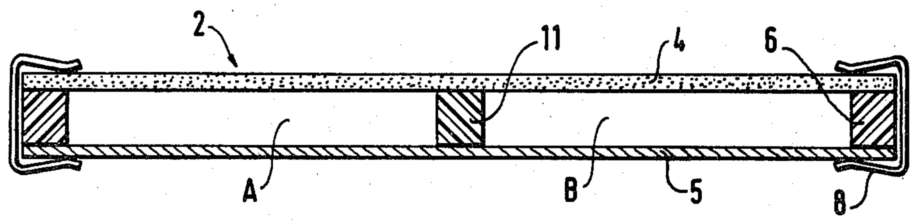
FIG. 4 is a section through a variant of the fluidiser shown in FIG. 3.

In the embodiment shown in FIG. 4, the fluidiser includes an interior seal 11, dividing the single fluidiser into two different fluidisation zones A and B.

Figure 5:
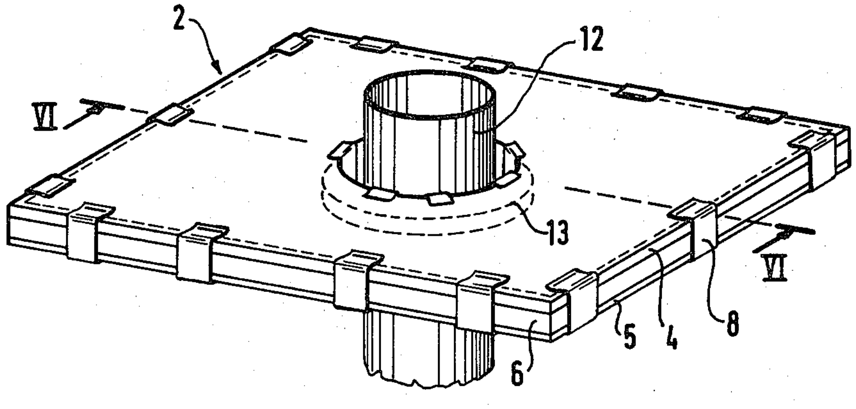
FIGS. 5 and 6 are a perspective view and a section illustrating the possibility of allowing an object to pass through a fluidiser.
Figure 6:
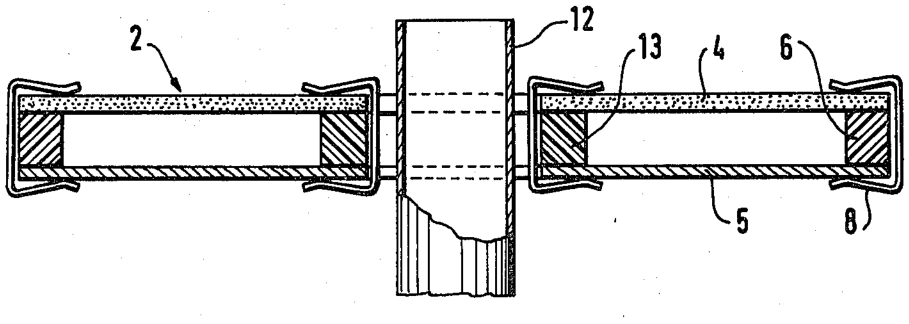

An object may pass through the fluidiser as shown in FIGS. 5 and 6, where a pipe 12 is shown passing through a fluidiser. The porous plate 4 and the base plate 5 both have a hole suitable for receiving the pipe 12 and a circular seal 13 is placed around the hole between the two plates. Clips 14, similar to the clips 8 hold the inner periphery together.

Figure 7:
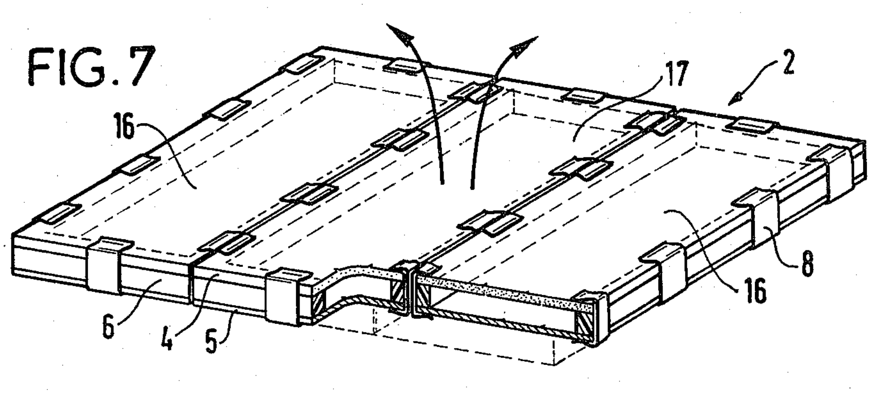
FIG. 7 is a partially cut-away perspective view showing a plurality of fluidisers juxtaposed.
Figure 8:
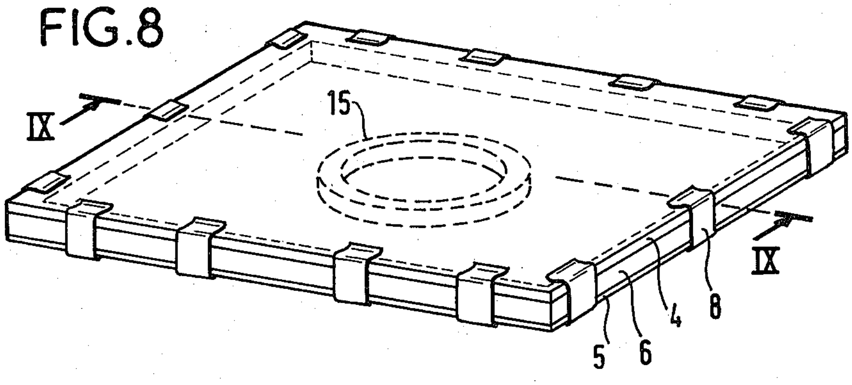
FIGS. 8,9 and 10 are diagrammatic illustrations of fluidisers suitable for mixing the fluidised substance by providing zones of differing degrees of fluidisation.
Figure 9:
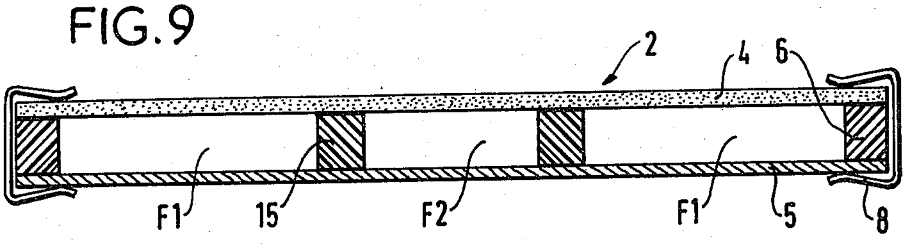
Figure 10:
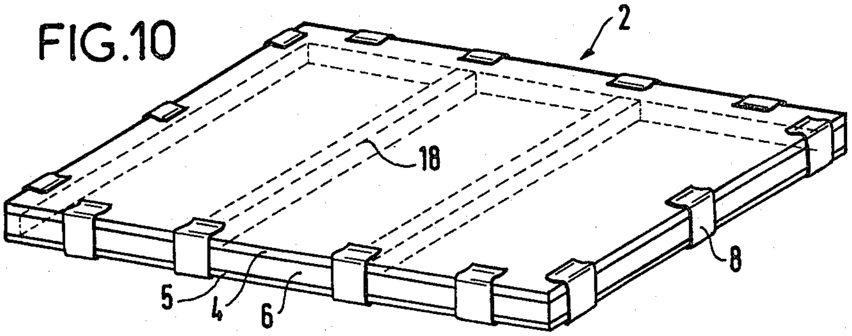

FIGS. 7 to 10, show examples of mixing using a fluidiser arrangement having zones of differing degrees fluidisation $F_1$ and $F_2$. These zones may be obtained from a single fluidiser having at least one internal seal 15 (FIG. 9) and by applying different pressures to the zones $F_1$ and $F_2$, or they may be obtained by juxtaposing fluidisers having porous members 16 and 17 which exhibit different porosity characteristics, as shown in FIG. 7. In FIG. 8, the internal seal 15 is annular and creates a circular internal zone of differing pressure. In FIG. 10, two straight internal seals 18 divide the fluidiser into three zones of differing degrees of fluidisation.

A fluidisation unit in accordance with the invention has the following advantages: the fluidiser is readily disassembled and each part thereof can easily be replaced. It is possible to install internal seals in a fluidiser and to arrange for a pipe to pass through the fluidising surface. The fluidisers are of a simple structure capable of rapid manufacture. It is possible to supply the fluidisers with gas through their fluidising plate, thereby facilitating the simple placing of a fluidiser on the appropriate surface. In situations where the chamber containing the fluidised powder is under pressure, the strength of the unit is provided by the walls of the chamber, thereby making it possible to use fluidisers which themselves are incapable of withstanding heavy mechanical loading.

By using zones differing degrees of fluidisation, it is possible to mix the fluidised substance.

The invention is applicable to electrostatic powdering installations, e.g. for enamelling metal parts as described in U.S. Pat. No. 4,301,764.

The invention is also applicable to grain silos for drying and storing grains such as wheat or maize, and for storing supplies of powder in general.

Figure 11:
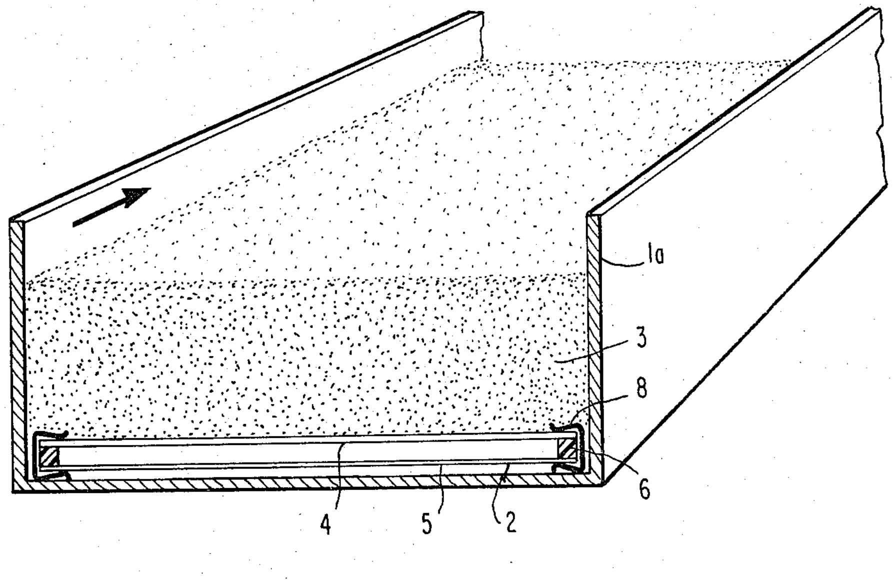
FIG. 11 is a perspective view of another embodiment of the invention wherein a duct forms the fluidising chamber.

The invention is also applicable to conveying or transporting powder or grains in ducts, FIG. 11, which may be of rectangular or cylindrical form, but clearly, if the invention is used for conveying powder along a cylindrical pipe, the porous sheet member and the base sheet member will need to be curved to match the shape of the duct rather than being plates as appropriate for a flat fluidiser.

I claim:

1. A fluidisation unit comprising: at least one fluidiser and a chamber for containing a granular, powdery or like substance to be fluidised, said chamber having a non-porous bottom wall, and said at least one fluidiser comprising an integral, removable assembly, said assembly comprising a non-porous base sheet member, a porous sheet member sized to and overlying said base sheet member, and holding means including a peripheral sealing member interposed between said sheet members about the edges thereof and holding the sheet members apart in a fixed relationship, and wherein said at least one fluidiser is removably installed in said chamber underlying said granular substance with its non-porous sheet member overlying and resting against said non-porous bottom wall of the chamber, and wherein each fluidiser assembly is a held together by clips.

2. A fluidisation unit according to claim 1, wherein the chamber constitutes a tubular duct for conveying a granular, powdery or like substance when fluidised parallel to said bottom wall.

3. A fluidisation unit according to any preceding claim, wherein the supply of gas under pressure to the fluidiser is supplied thereto the porous sheet member.

* * * * *